(12) United States Patent
Albrecht et al.

(10) Patent No.: US 12,391,389 B2
(45) Date of Patent: Aug. 19, 2025

(54) SYSTEMS AND METHODS FOR DEICING AIRCRAFT

(71) Applicant: THE BOEING COMPANY, Chicago, IL (US)

(72) Inventors: Mark Everette Albrecht, Lake Stevens, WA (US); Richard John Loftis, Daniel Island, SC (US); Marcus Anthony Belcher, Sammamish, WA (US); Edwin John Smith, Everett, WA (US); Kristofer Logan Peterson, Lynnwood, WA (US); Collin William Childs, Newcastle, WA (US); Benjamin David Walker, West Linn, OR (US); Jonathan William Udell, Renton, WA (US); Doria Pei, Seattle, WA (US); Robert N. Jaeger, Seattle, WA (US); Sara Jane Lynn, Spokane Valley, WA (US); Mirza Mustafayev, Everett, WA (US); Ignas Sabet-Kazilas, Snoqualmie, WA (US); Varun Suri, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 17/961,747

(22) Filed: Oct. 7, 2022

(65) Prior Publication Data

US 2024/0116638 A1     Apr. 11, 2024

(51) Int. Cl.
    *B64D 15/12*     (2006.01)
(52) U.S. Cl.
    CPC .................... *B64D 15/12* (2013.01)

(58) Field of Classification Search
    CPC ........ B64D 15/12; B64D 15/20; B64D 15/22; H05B 1/023; H05B 2214/02
    See application file for complete search history.

(56) References Cited

U.S. PATENT DOCUMENTS

| 2,414,520 | A | * | 1/1947 | Greenwald | ............ | B64D 15/12 |
|           |   |   |        |           |              | 219/203     |
| 5,131,812 | A |   | 7/1992 | Boyd      |              |             |

(Continued)

FOREIGN PATENT DOCUMENTS

| CN | 103662083 | 6/2016 |
|----|-----------|--------|
| CN | 112193421 | 1/2021 |

(Continued)

OTHER PUBLICATIONS

"Boston-Based Company De-Ice(TM) Brings Fast, Chemical-Free De-Icing to Global Airline Industry," December 5, 2023, https://www.prnewswire.com/news-releases/boston-based-company-de-ice-brings-fast-chemical-free-de-icing-to-global-airline-industry-302006052.html.

*Primary Examiner* — Joshua J Michener
*Assistant Examiner* — Ashesh Dangol
(74) *Attorney, Agent, or Firm* — Joseph M. Butscher; The Small PAtent LAw Group LLC (57) ABSTRACT

An aircraft includes external structures, and one or more thermal emitters integrated with one or more of the external structures. The one or more thermal emitters are configured to generate heat to deice the one or more external structures. The one or more thermal emitters are configured to receive electrical power from one or more of an auxiliary power unit of the aircraft, a power distribution system of the aircraft, one or more engines of the aircraft, or an external power cart that is separate and distinct from the aircraft.

24 Claims, 7 Drawing Sheets

(56) References Cited

U.S. PATENT DOCUMENTS

| | | |
|---|---|---|
| 5,934,617 A | 8/1999 | Rutherford |
| 6,129,314 A | 10/2000 | Giamati |
| 6,330,986 B1 * | 12/2001 | Rutherford ............ B64D 15/14 244/134 R |
| 6,338,455 B1 | 1/2002 | Rauch |
| 7,763,833 B2 | 7/2010 | Hindel |
| 8,337,658 B2 | 12/2012 | Hasegawa |
| 9,133,714 B2 | 9/2015 | Vontell |
| 9,193,466 B2 | 11/2015 | Calder |
| 9,221,544 B2 | 12/2015 | Armatorio |
| 9,253,823 B2 * | 2/2016 | Nordman ................ B32B 9/005 |
| 9,321,536 B2 | 4/2016 | Snir |
| 9,462,700 B2 | 10/2016 | Frankenberger |
| 9,511,871 B2 | 12/2016 | Steinwandel |
| 10,155,373 B2 | 12/2018 | Nino |
| 10,457,404 B2 | 10/2019 | Chee |
| 10,464,680 B2 | 11/2019 | Kinlen |
| 10,494,107 B2 | 12/2019 | Dardona |
| 11,008,109 B2 | 5/2021 | Khuong |
| 11,084,593 B2 | 8/2021 | George |
| 2004/0245395 A1 | 12/2004 | Wallace |
| 2011/0049300 A1 * | 3/2011 | Safai ...................... B64D 15/12 244/134 D |
| 2012/0207456 A1 * | 8/2012 | Kim ...................... H05B 3/744 392/411 |
| 2014/0234552 A1 * | 8/2014 | Frankenberger ....... B64D 45/02 427/58 |
| 2019/0016466 A1 | 1/2019 | Botura |
| 2020/0023975 A1 | 1/2020 | Chauvet |
| 2020/0062408 A1 | 2/2020 | Bratianu-Badea |
| 2020/0122825 A1 * | 4/2020 | Bottasso ................ B64C 27/82 |
| 2020/0239036 A1 * | 7/2020 | Lee ........................ B61B 13/00 |
| 2021/0102294 A1 * | 4/2021 | Miljkovic ........... C23C 14/5853 |

FOREIGN PATENT DOCUMENTS

| | | | |
|---|---|---|---|
| DE | 102008051533 | | 4/2010 |
| DE | 102008063409 | | 7/2010 |
| DE | 102019102401 A1 * | 8/2019 | .............. A61B 5/01 |
| FR | 3003427 | | 8/2016 |

* cited by examiner

SYSTEMS AND METHODS FOR DEICING AIRCRAFT

FIELD OF THE DISCLOSURE

Examples of the present disclosure generally relate to systems and methods for deicing aircraft.

BACKGROUND OF THE DISCLOSURE

Aircraft are used to transport passengers and cargo between various locations. Numerous aircraft depart from and arrive at a typical airport every day.

During periods of inclement weather, such as when the temperature is at or below freezing and precipitation is present, aircraft are often deiced before departing an airport. A known deicing process includes spraying exterior surfaces of an aircraft with chemicals, which typically includes some form of liquid antifreeze mixed with water, and heated to 180 degrees F. The aircraft is generally deiced before departure from an airport. However, the deicing process may not provide protection after the deicing liquid has been applied to the aircraft. For example, ice can build up on surfaces after the deicing process, and before takeoff. Additionally, the deicing process is time and labor intensive, as well as costly in terms of materials for the deicing liquid, as well as equipment used to apply the deicing liquid. Also, deicing liquid that flows off of the aircraft typically needs to be collected and properly disposed.

SUMMARY OF THE DISCLOSURE

A need exists for an improved system and method for deicing surfaces of an aircraft. Further, a need exists for an effective and efficient system and method for deicing surfaces of an aircraft. Also, a need exists for a cost-effective and environmentally friendly system and method for deicing surfaces of an aircraft.

With those needs in mind, certain examples of the present disclosure provide an aircraft including external structures, and one or more thermal emitters integrated with one or more of the external structures. The one or more thermal emitters are configured to generate heat to deice the one or more external structures. The one or more thermal emitters are configured to receive electrical power from one or more of an auxiliary power unit of the aircraft, a power distribution system of the aircraft, one or more engines of the aircraft, an external power cart that is separate and distinct from the aircraft, one or more batteries, a power generator, and/or the like.

The external structures can include one or more of a fuselage, one or more wings, an empennage, a vertical stabilizer, a horizontal stabilizer, or control surfaces.

In at least one example, the one or more thermal emitters are integrated with all of the external structures.

In at least one example, the one or more thermal emitters are mounted to one or more exterior surfaces of the one or more external structures.

In at least one example, the one or more thermal emitters are embedded within the one or more external structures.

In at least one example, the one or more thermal emitters are formed of a metal matrix composite.

In at least one example, the one or more thermal emitters include one or more of wires, ribbons, tape, or strips.

In at least one example, the one or more thermal emitters cover less than an entirety of the one or more external structures.

In at least one example, the one or more thermal emitters include a plurality of segments spaced apart from one another in relation to the one or more external structures.

In at least one example, the one or more thermal emitters include a grid having a plurality of segments separated by open areas.

In at least one example, the one or more thermal emitters further provide electromagnetic effect protection to the one or more external structures without a separate current carrying path.

In at least one example, a control unit is configured to determine a configuration for the one or more thermal emitters based on a unit area that is representative of a portion of the one or more external structures. In at least one example, the control unit is configured to generate a one dimensional thermal resistance model to determine a temperature of an exposed outer mold line patch of the aircraft.

In at least one example, the one or more thermal emitters include a plurality of cells connected together in a tessellated pattern.

Certain examples of the present disclosure provide a method including integrating one or more thermal emitters with one or more of external structures of an aircraft; providing electrical power to the one or more thermal emitters by one or more of an auxiliary power unit of the aircraft, a power distribution system of the aircraft, one or more engines of the aircraft, an external power cart that is separate and distinct from the aircraft, one or more batteries, a power generator, and/or the like; and generating heat, by the one or more thermal emitters, to deice the one or more external structures.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide systems and methods for deicing portions of an aircraft. In at least one example, systems and methods are configured to enable an aircraft to self-deice while on the ground using thermal emitters applied to external structures of the aircraft. In at least one example, electrical power is provided to the thermal emitters through one or more of a power distribution system of the aircraft, an external power cart while the aircraft is stationary on the ground, and/or or by auxiliary power unit or main engines while the aircraft is in motion (such as taxiing to a runway, or while airborne).

Figure 1:
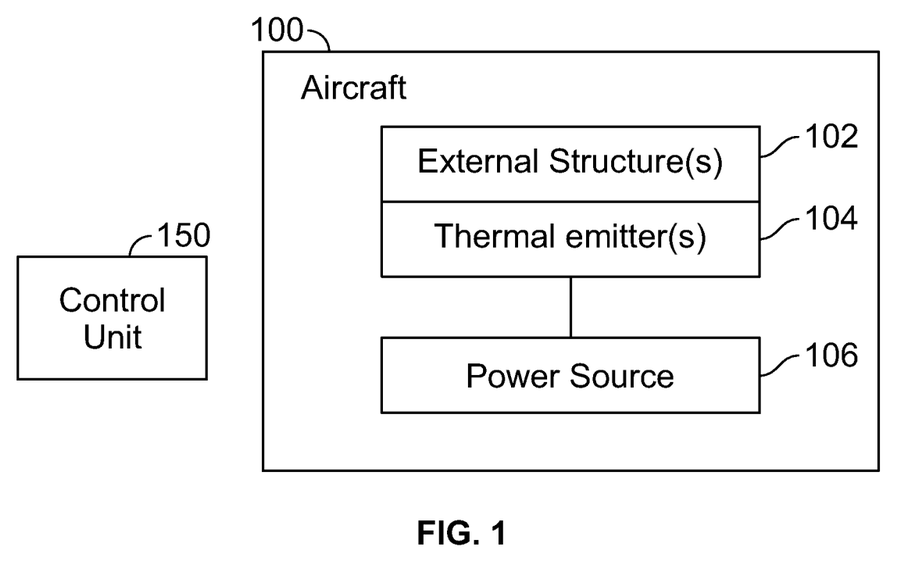
FIG. 1 illustrates a block diagram of an aircraft, according to an example of the present disclosure.

FIG. 1 illustrates a block diagram of an aircraft 100, according to an example of the present disclosure. The aircraft 100 includes external structures 102, such as a fuselage, wings, an empennage, a vertical stabilizer, a horizontal stabilizer, control surfaces (such as ailerons, flaps, etc.), and the like. One or more thermal emitters 104 are coupled to one or more of the external structures 102. In at least one example, thermal emitters 104 are coupled to all of the external structures 102 of the aircraft 100. In at least one other example, thermal emitters 104 are coupled to less than all of the external structures 102 of the aircraft 100.

The thermal emitters 104 are integrated with the external structures 102. For example, the thermal emitters 104 are mounted to exterior surfaces (for example, an outer mold line) of the external structures 102. The thermal emitters 104 can be secured to the exterior surfaces of the external structures 102 through adhesives, fasteners, bonding, and/or the like. As another example, the thermal emitters 104 can be etched onto the exterior surfaces of the external structures 102. As another example, the thermal emitters 104 are embedded within the external structures 102. For example, the external structures 102 can be formed of composite materials, and the external structures 102 can be secured within one or more plies or layers of the external structures 102. As another example, the thermal emitters 104 can be secured to internal surfaces (opposite from the external surfaces) of the external structures 102, such as an interior wall of a fuselage.

The thermal emitters 104 are formed of a material that is configured to conduct, radiate, and/or otherwise emit heat when activated and connected to a power source 106. For example, the thermal emitters 104 can be formed of one or more metals, such as copper, aluminum, steel, metallic alloys, and/or the like. As another example, the thermal emitters 104 can be formed of carbon. As another example, the thermal emitters can be formed of a metal matrix composite, such as a composite matrix having fibers or particles dispersed in a metallic matrix, such as copper, aluminum, steel, or the like. The thermal emitters 104 can be wires, ribbons, tape, strips, and/or the like. In at least one example, the thermal emitters have a width of 6 inches or less, and a thickness (for example, height) of 2 inches or less. Optionally, the thermal emitters can have a width greater than 6 inches, and a thickness that is greater than 2 inches.

In at least one example, the thermal emitters 104 include segments that cover less than an entirety of an external structure 102. For example, the segments can be spaced between 4-6 inches from one another. By spacing portions of the thermal emitters 104 so that the entirety of the external structure 102 is not covered, less material is used, and the weight of the aircraft is reduced. Alternatively, an entirety of the external structure 102 may be covered by the thermal emitters 104.

The thermal emitters 104 are coupled to the power source 106 through one or more wired or wireless connections. In operation, the thermal emitters 104 can be activated, such as by a pilot within a flight deck. When activated, the thermal emitters 104 draw power from the power source 106 and generate heat to melt ice on the external structures 102 and/or prevent ice from forming thereon. The thermal emitters 104 deice the external structures 102 without the need for a separate and distinct deicing liquid. Further, the thermal emitters 104 can be operated to deice the external structures 102 when the aircraft 100 is parked at a gate, moving along a taxiway or runway, and/or while airborne.

Figure 2:
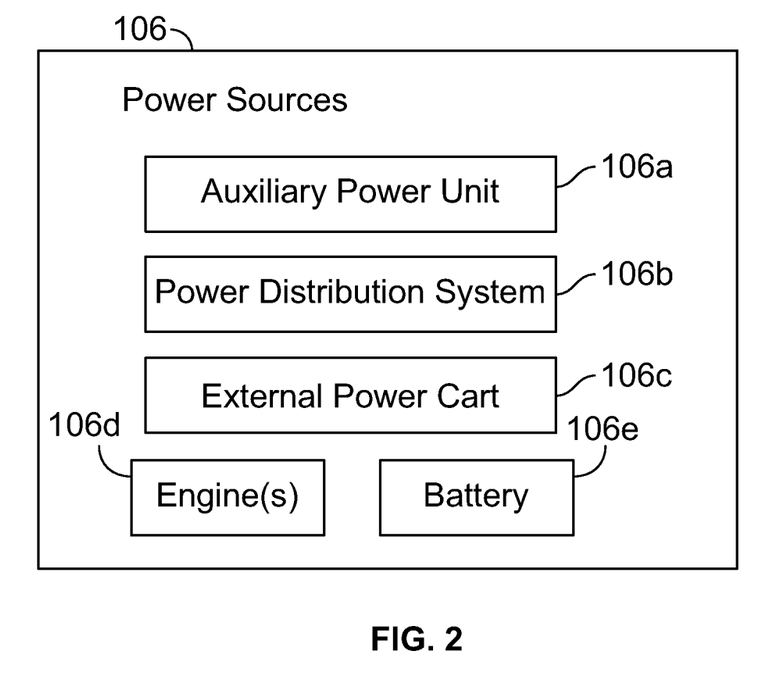
FIG. 2 illustrates a block diagram of power sources, according to an example of the present disclosure.

FIG. 2 illustrates a block diagram of power sources 106, according to an example of the present disclosure. Examples of power sources 106 include an auxiliary power unit 106a of the aircraft 100 (shown in FIG. 1), a power distribution system 106b of the aircraft 100, an external power cart 106c that is separate and distinct from the aircraft 100, one or more engines 106d of the aircraft 100, one or more batteries 106e, a power generator, one or more solar cells, one or more wind turbines, and or the like. Referring to FIGS. 1 and 2, the thermal emitters 104 can be electrically powered by the auxiliary power unit 106a of the aircraft 100, the power distribution system 106b of the aircraft 100, the engines 106d of the aircraft 100 (such as when the aircraft 100 is in motion), and/or the external power cart 106c (such as when the aircraft 100 is stationary).

The external structures 102 can be formed of one or more composite materials, one or more metals, and/or the like. The thermal emitters 104 are coupled to the external structures 102 (for example, secured directly onto exterior surfaces and/or embedded therein). When activated, the thermal emitters 104 conduct heat, thereby melting any ice that has accumulated on the external structures 102 and preventing ice from forming thereon. As such, the external structures 102 of the aircraft 100 can be deiced while the aircraft 100 is stationary, moving on the ground, and/or airborne.

The thermal emitters 104 are coupled to the external structures 102 to provide sufficient heat to deice the external surfaces of the external structures 102. In at least one example, a geometry model for the thermal emitters is optimized to maximize or otherwise increase a deicing rate, using a grid pattern that is less than an entire external surface to reduce weight. For example, the thermal emitters 104 can be configured as a continuous grid on and/or within the external structures 102. As another example, the thermal emitters 104 can be configured to include a main power trace coupled to branching segments (for example, traces), which can be electrically connected in parallel. Spacing between the segments can be based on curvature of the external structures 102 (such as wings).

In at least one example, the thermal emitters 104 include segments (for example, traces) that are cut or deposited onto the external structures 102. The segments are spaced apart from one another to provide desired heating to the external structures 102. In at least one example, the thermal emitters 104 can also provide electromagnetic effect protection to the external structures 102 as a secondary function by providing a current carrying path. Known aircraft have copper foil as a current carrying path to accept electric charge and convey current so it can be bled off plane. The thermal emitters 104 can therefore also be used to perform such current carrying paths, and therefore the copper foil material can be removed, thereby reducing overall weight of the aircraft 100. In at least one example, the segments of the thermal emitters 104 can run under fasteners, thereby providing an integrated current return path.

As described herein, the aircraft 100 includes the external structures 102. One or more thermal emitters 104 are integrated with one or more of the external structures 102. The one or more thermal emitters 104 are configured to generate heat to deice the one or more external structures 102. The one or more thermal emitters 104 are configured to receive electrical power from one or more of the auxiliary power unit 106a of the aircraft 100, the power distribution system 106b of the aircraft 100, one or more engines 106d of the aircraft 100, or the external power cart 106c that is separate and distinct from the aircraft 100.

Figure 3:
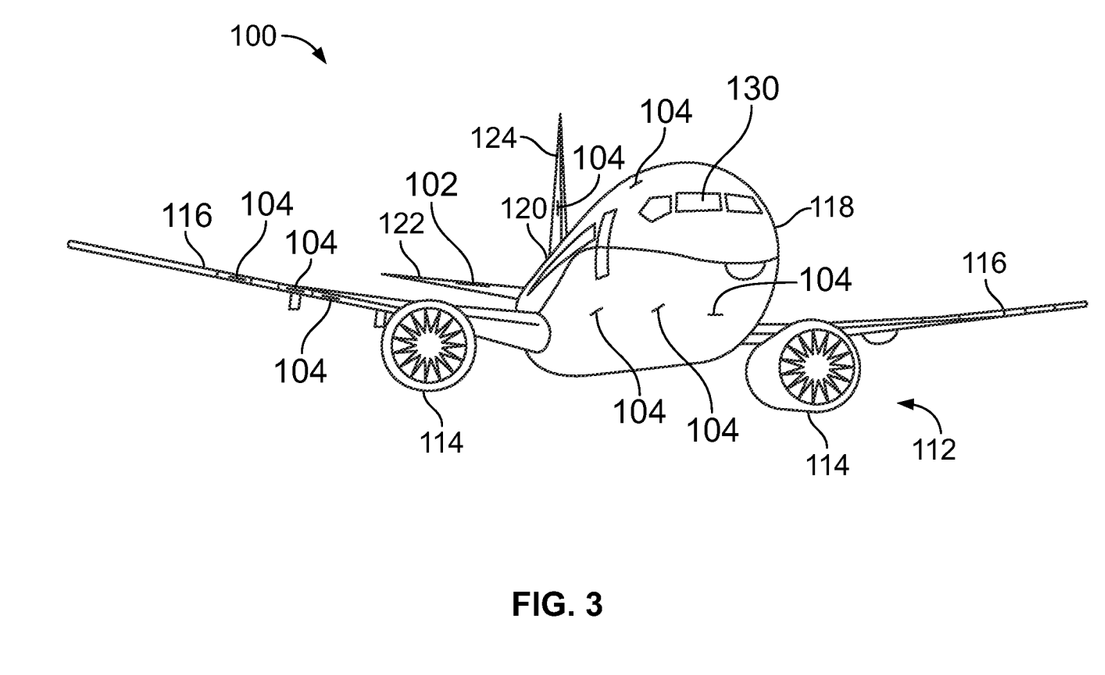
FIG. 3 illustrates a perspective front view of an aircraft, according to an example of the present disclosure.

FIG. 3 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124. The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like. FIG. 3 shows an example of an aircraft 100. It is to be understood that the aircraft 100 can be sized, shaped, and configured differently than shown in FIG. 3.

Thermal emitters 104 are coupled to one or more external structures of the aircraft 100. For example, thermal emitters 104 are coupled to the wings 116, the fuselage 118, the empennage 120, the horizontal stabilizers 122, the vertical stabilizer 124, and/or the like.

Referring to FIGS. 1-3, in at least one example, the thermal emitters 104 are formed of a metal matrix composite. The thermal emitters 104 are configured to emit conductive heat energy used to heat an outer mold line of a wing 116 to a desired temperature, melt any ice accumulated thereon, and prevent ice from forming thereon.

Figure 4:
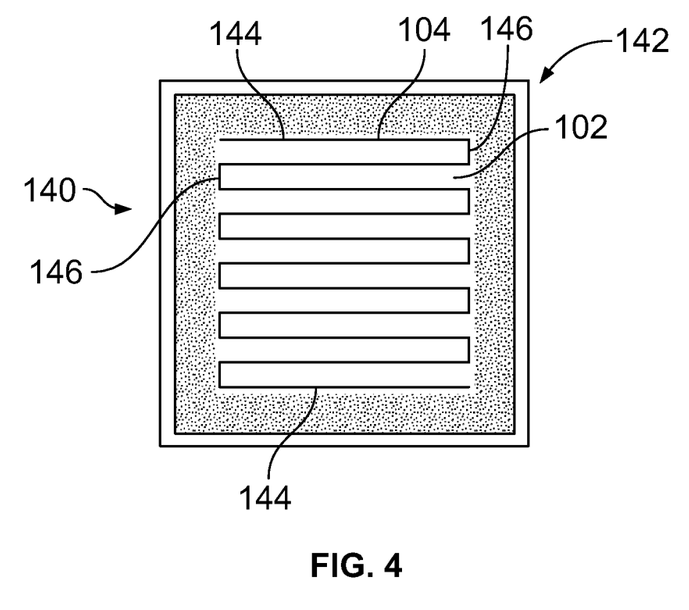
FIG. 4 illustrates a top view of a unit area of a deicing system, according to an example of the present disclosure.

FIG. 4 illustrates a top view of a unit area 140 of a deicing system 142, according to an example of the present disclosure. Referring to FIGS. 1 and 4, a control unit 150 generates a unit representation (that is, the unit area 140) of the deicing system 142. The unit area 140 is a one dimensional thermal resistance model such that the temperature of an exposed outer mold line patch, some distance away from a thermal emitter 104, can be determined. In at least one example, the control unit 150 simplifies an overall deicing system, through creation of the unit area 140, which can have dimensions of a metal matrix composite width and thickness, and exposed length in relation to an outer mold line.

The unit area 140 includes a thermal emitter 104 including a plurality of segments over a portion of an external structure 102. For example, horizontal segments (for example, traces) 144 are spaced apart from one another by vertical segments (for example, traces) 146, which are orthogonal to the horizontal segments 146. The control unit 150 is configured to determine the spacing between the segments (such as the spacing provided by the vertical segments 146) so that the thermal emitter 104 provides sufficient deicing heat (that is, sufficient heat to melt ice and prevent ice from forming) to the portion of the external structure 102 within a predetermined desired time.

In at least one example, the control unit 150 is configured to determine a configuration for a thermal emitter 104 in relation to an external structure 102, such as a wing, through analysis of the unit area 140, which is a representative portion of the external structure 102, such as a 1 foot by 1 foot portion of the external structure 102. The control unit 150 determines the desired heat to apply for deicing in relation to the unit area 140, which is then used to determine the configuration for the thermal emitter in relation to an entirety of the external structure 102. In this manner, the control unit 150 simplifies and process of determining the configuration for the thermal emitter 104 by analyzing a much smaller portion, and thereby conserving computing power.

In at least one example, the control unit 150 is configured to optimize the thermal emission circuit geometry and power requirements of a deicing system for use in relation to external structures 102 of an aircraft 100. The control unit 150 creates the unit area 140, which is a representation of a portion of the deicing system 142. The control unit 150 further generates a one dimensional thermal resistance model such that the temperature of an exposed outer mold line patch of the aircraft 100, which is a predetermined distance away from segments of the thermal emitter 104, is determined.

Figure 5:
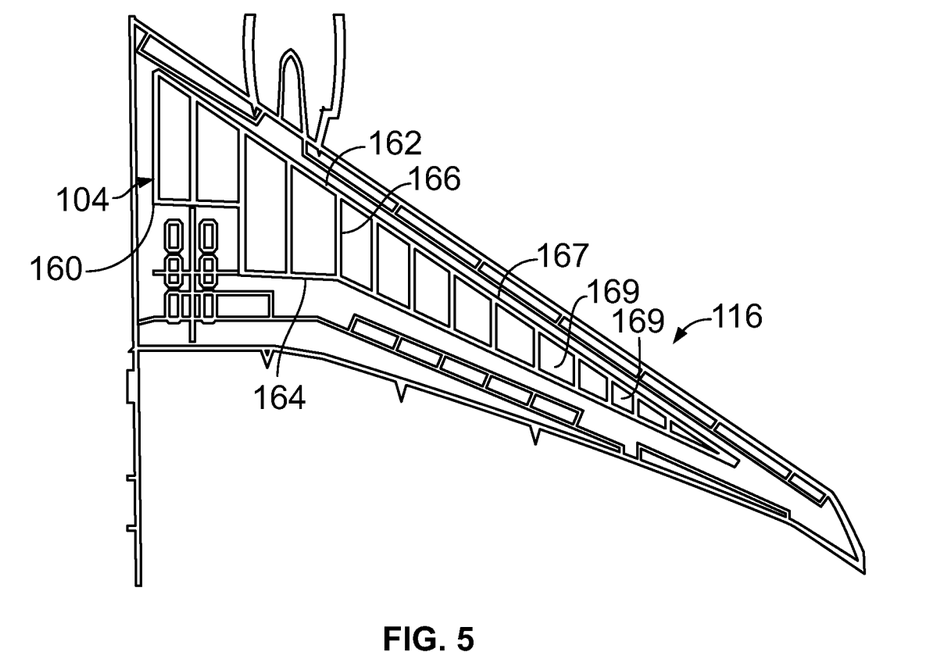
FIG. 5 illustrates a top view of a wing, according to an example of the present disclosure.
Figure 6:
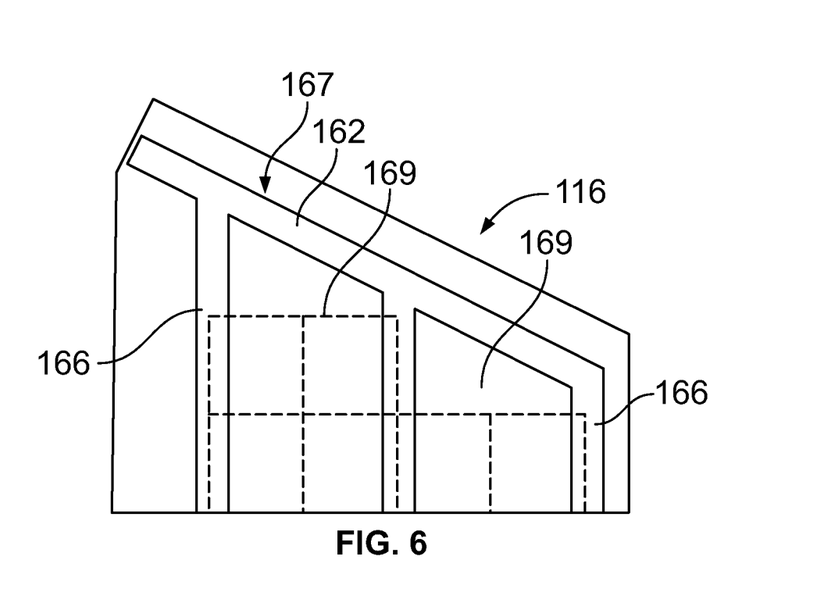
FIG. 6 illustrates a portion of the wing of FIG. 5.

FIG. 5 illustrates a top view of a wing 116, according to an example of the present disclosure. FIG. 6 illustrates a portion of the wing 116 of FIG. 5. Referring to FIGS. 1-6, the wing 116 is an example of an external structure 102 (shown in FIG. 1). A thermal emitter 104 is coupled to the wing 116. For example, the thermal emitter 104 is mounted on an exterior surface of the wing 116. As another example, the thermal emitter 104 is embedded within the wing 116.

The thermal emitter 104 includes a main power trace 160, which can be directly connected to the power source 106. The main power trace 160 connects to lateral segments 162 and 164, such as at a front and rear of the wing 116, respectively. The lateral segments 162 and 164 connect to interior longitudinal segments 166, which are spaced apart from one another. The configuration shown in FIGS. 5 and 6 is merely exemplary, and is not to scale. The spacing between the lateral segments 162 and 164 and the longitudinal segments 166 can be based on curvature of the wing 116.

The main power trace 160, the lateral segments 162 and 164, and the longitudinal segments 166 provide a grid 167 having open areas 169 between the lateral segments 162, 164, and longitudinal segments 166. As such, the grid 167 does not cover an entirety of the external structure, such as the wing 116. As such, the grid 167 includes a plurality of open areas 169 therein. The open areas 169 are locations of the external structure that are not covered by the thermal emitter 104. The lateral segments 162 and 164 and the longitudinal segments 166 are configured to generate heat to deice the portions of the external structure within the open areas 169 in a predetermined period of time. Because the thermal emitter 104 includes the various open areas 169, the thermal emitter 104 reduces an overall weight of the aircraft (in contrast to thermal emitters that cover an entirety of an external structure). As shown, one or more thermal emitters 104 include the grid 167 having a plurality of segments 162, 164, and 166 separated by open areas 169.

The control unit 150 is configured to determine a desired configuration, including the spacing between segments, of the thermal emitter 104. For example, the control unit 150 can determine the configuration for the thermal emitter 104 based on a predetermined maximum service temperature, dimensions of the external structure 102 (such as the wing 116), a minimum and/or maximum deicing time, required power, and the like. In at least one example, the control unit 150 performs a one dimensional analysis, which assumes no heat flux at boundaries of the wing 116 and/or the thermal emitter 104, and no area gradient.

In at least one example, the control unit 150 determines the configuration for the thermal emitter 104, such as via the unit area 140 shown in FIG. 4, by referencing a predetermined heat necessary to create a layer of water under a stack of snow and ice. For example, specific heat to melt ice can be programmed into a memory of the control unit 150. The control unit 150 then analyzes the mass of melting ice, and can assume a particular loss.

In at least one example, the control unit 150 assumes full wing coverage of the thermal emitter 104. For example, the control unit 150 assumes that the thermal emitter 104 covers an entirety of the wing 116. The control unit 150 then determines an amount of energy needed to heat the wing 116, via the thermal emitter 104, to a desired set temperature. Next, the control unit 150 may assume a predetermined worst case scenario of accumulation of snow and ice on the wing 116. The control unit 150 may then calculate the amount of energy need to heat the full coverage material to a predetermined set temperature, and the amount of energy needed to melt a layer of ice on the wing 116. The control unit 150 may then conclude that most of the energy is directed into the phase change of ice into liquid water However, as noted, in order to reduce weight, the thermal emitter 104 may not cover an entirety of the wing 116.

As such, the control unit 150 may then assume a patterned wing coverage of the thermal emitter 104, such as shown in FIGS. 5 and 6. The control unit 150 may then analyze the unit area 140, shown in FIG. 4, which includes a predetermined configuration for the thermal emitter 104. The control unit 150 may then calculate the amount of energy needed to heat the thermal emitter 104 such that the temperature at the far end of the wing 116 will be at the predetermined temperature.

Figure 7:
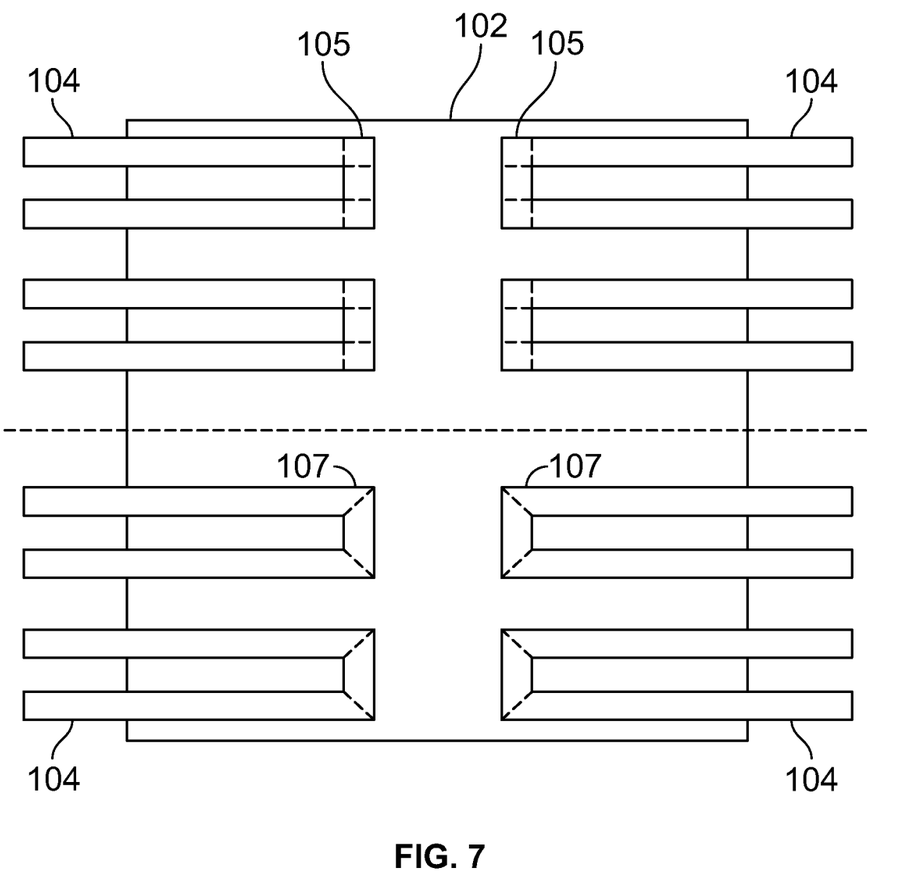
FIG. 7 illustrates a top view of thermal emitters coupled to an external structure, according to an example of the present disclosure.

FIG. 7 illustrates a top view of thermal emitters 104 coupled to an external structure, according to an example of the present disclosure. The thermal emitters 104 can include overlapping portions 105 and/or end-to-end welds 107.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 150 can be or include one or more processors that are configured to control operation, as described herein.

The control unit 150 is configured to execute a set of instructions that are stored in one or more data storage units or elements (such as one or more memories), in order to process data. For example, the control unit 150 can include or be coupled to one or more memories. The data storage units can also store data or other information as desired or needed. The data storage units can be in the form of an information source or a physical memory element within a processing machine.

The set of instructions may include various commands that instruct the control unit 150 as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program, or a portion of a program. The software can also include modular programming in the form of object-oriented programming. The processing of input data by the processing machine may be in response to user commands, or in response to results of previous processing, or in response to a request made by another processing machine.

The diagrams of examples herein illustrate one or more control or processing units, such as the control unit 150. It is to be understood that the processing or control units can represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit 150 can represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 8:
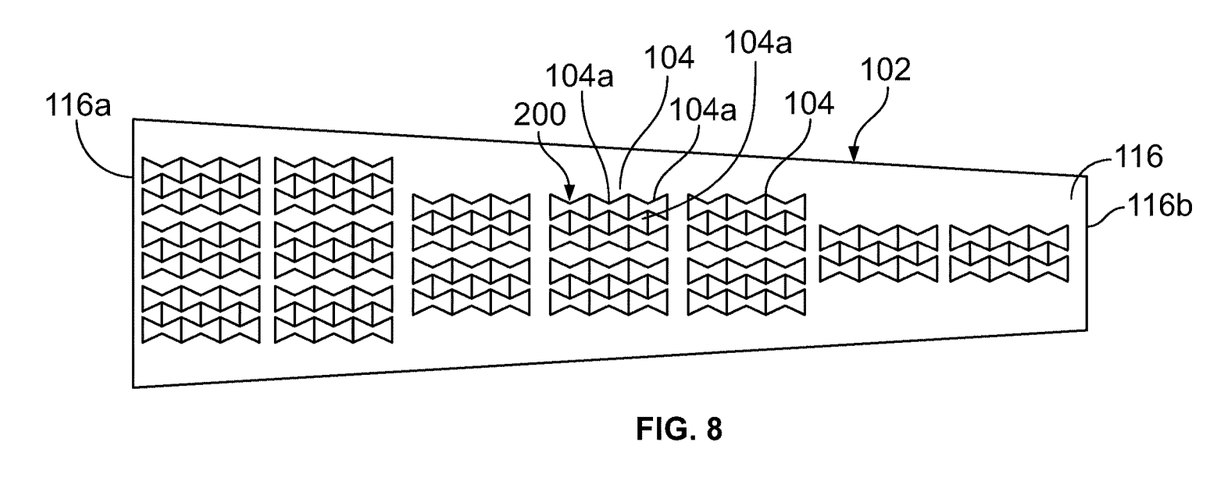
FIG. 8 illustrates a top view of an external structure having thermal emitters, according to an example of the present disclosure.
Figure 9:
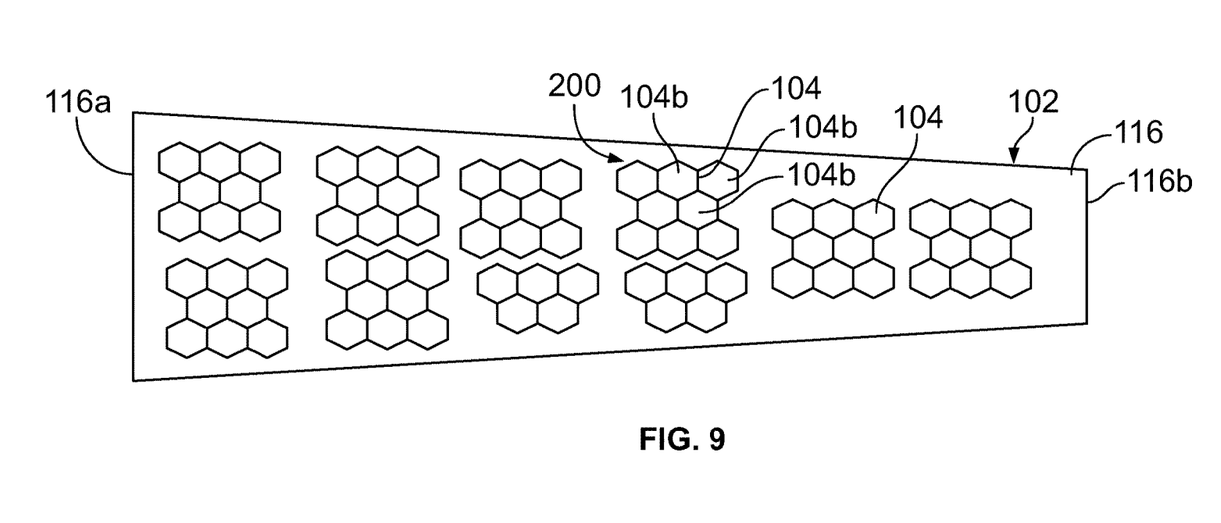
FIG. 9 illustrates a top view of an external structure having thermal emitters, according to an example of the present disclosure.

FIG. 8 illustrates a top view of an external structure 102 having thermal emitters 104, according to an example of the present disclosure. FIG. 9 illustrates a top view of an external structure 102 having thermal emitters 104, according to an example of the present disclosure. Referring to FIGS. 8 and 9, the external structure 102 can be a wing 116.

In at least one example, the thermal emitters 104 can be formed of a metal matrix composite secured to the wing 116. The thermal emitters 104 remain attached to the surface while strain is induced in or experienced by the wing 116 after flexing. In at least one example, the thermal emitters 104 can include a plurality of non-flexible cells 104a or 104b connected together in a tessellated pattern 200 of shapes, such as hexagons, octagons, bow-tie shapes, various other polygonal shapes, and/or the like that allow for flexibility therebetween along multiple axes. The tessellated pattern or geometry 200 absorbs movement and allows the metal matrix component material to flex with the wing 116 as strain is induced, and remain attached to the surface of the wing 116 from the wing root 116a to the wing tip 116b. Tessellated patterns 200 allow flexing, and may have geometries with a negative Poisson's ratio (also referred to as auxetic materials). Poisson's ratio defines how a material expands or contracts transversely under longitudinal compression. A positive Poisson's ratio intuitively posits that a material will or must expand in the orthogonal direction when compressed. A negative Poisson's ratio means that a material will contract under tension or expand under pressure. The maximum spacing and distance on the tessellated shapes can remain the same across the entire surface of the external structure 102, with a larger number of rows of shapes near the wider area of the wing root 116*a* (for example, 10 rows). The number of rows of shapes can decrease as the width narrows toward the wing tip 116*b*.

Figure 10:
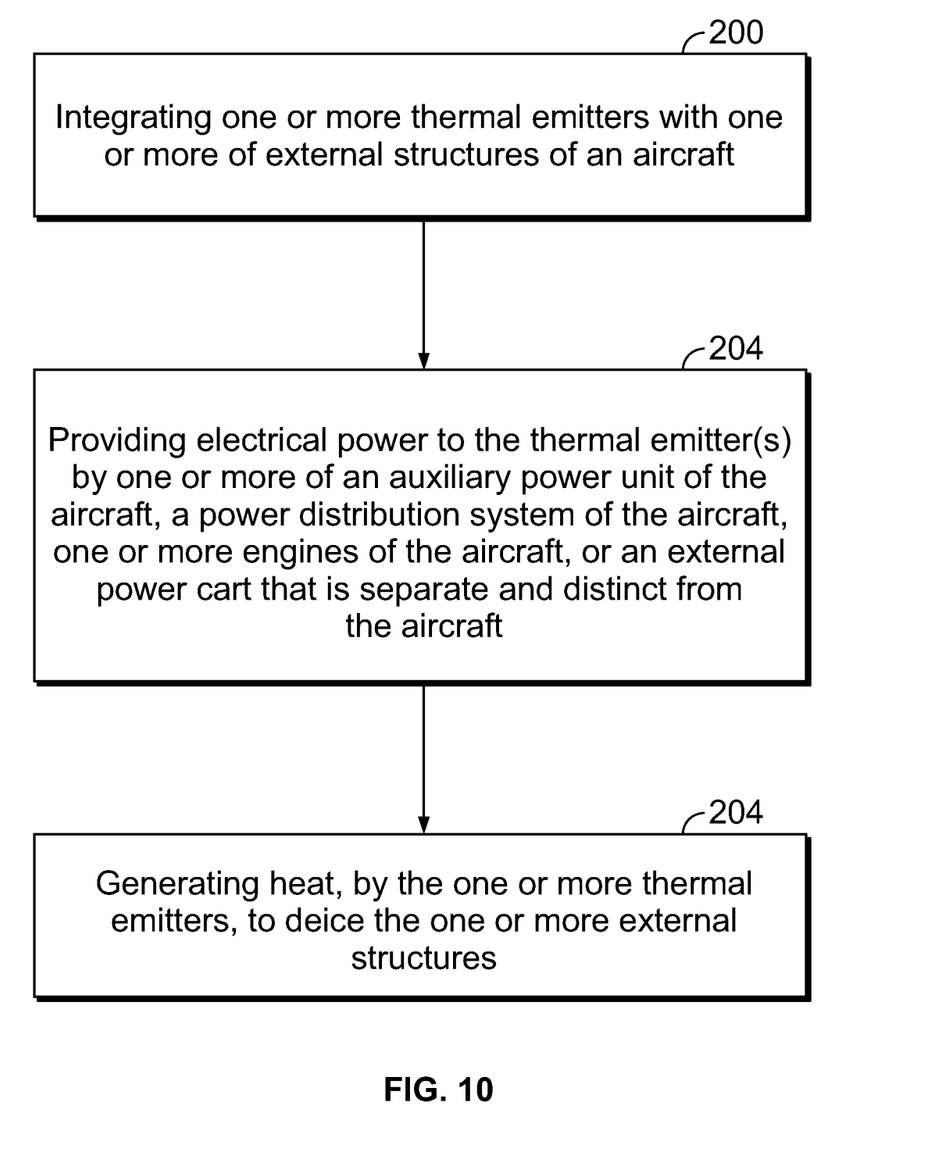
FIG. 10 illustrates a flow chart of a deicing method, according to an example of the present disclosure.

FIG. 10 illustrates a flow chart of a deicing method, according to an example of the present disclosure. Referring to FIGS. 1-10, the method includes integrating 200 one or more thermal emitters 104 with one or more of external structures 102 of an aircraft 100; providing 202 electrical power to the one or more thermal emitters 104 by one or more of an auxiliary power unit 106*a* of the aircraft 100, a power distribution system 106*b* of the aircraft 100, one or more engines 106*d* of the aircraft 100, or an external power cart 106*c* that is separate and distinct from the aircraft 100; and generating 204 heat, by the one or more thermal emitters 104, to deice the one or more external structures 102.

In at least one example, said integrating 200 includes integrating the one or more thermal emitters 104 with all of the external structures 102. In at least one example, said integrating 200 includes mounting the one or more thermal emitters 104 to one or more exterior surfaces of the one or more external structures 102. In at least one example, said integrating 200 includes covering less than an entirety of the one or more external structures 102 with the one or more thermal emitters 104.

In at least one example, the method also includes providing, by the one or more thermal emitters 104, electromagnetic effect protection to the one or more external structures 102 without a separate current carrying path.

In at least one example, the method also includes determining, by a control unit 150, a configuration for the one or more thermal emitters 104 based on a unit area 140 that is representative of a portion of the one or more external structures 102. The method can also include generating, by the control unit 150, a one dimensional thermal resistance model to determine a temperature of an exposed outer mold line patch of the aircraft 100.

In at least one example, said integrating includes tessellating a plurality of cells together.

Further, the disclosure comprises examples according to the following clauses:

Clause 1. An aircraft comprising:
external structures; and
one or more thermal emitters integrated with one or more of the external structures, wherein the one or more thermal emitters are configured to generate heat to deice the one or more external structures, and wherein the one or more thermal emitters are configured to receive electrical power from one or more of an auxiliary power unit of the aircraft, a power distribution system of the aircraft, one or more engines of the aircraft, or an external power cart that is separate and distinct from the aircraft.

Clause 2. The aircraft of Clause 1, wherein the external structures comprise one or more of a fuselage, one or more wings, an empennage, a vertical stabilizer, a horizontal stabilizer, or control surfaces.

Clause 3. The aircraft of Clauses 1 or 2, wherein the one or more thermal emitters are integrated with all of the external structures.

Clause 4. The aircraft of any of Clauses 1-3, wherein the one or more thermal emitters are mounted to one or more exterior surfaces of the one or more external structures.

Clause 5. The aircraft of any of Clauses 1-4, wherein the one or more thermal emitters are embedded within the one or more external structures.

Clause 6. The aircraft of any of Clauses 1-5, wherein the one or more thermal emitters are formed of a metal matrix composite.

Clause 7. The aircraft of any of Clauses 1-6, wherein the one or more thermal emitters comprise one or more of wires, ribbons, tape, or strips.

Clause 8. The aircraft of any of Clauses 1-7, wherein the one or more thermal emitters cover less than an entirety of the one or more external structures.

Clause 9. The aircraft of any of Clauses 1-8, wherein the one or more thermal emitters comprise a plurality of segments spaced apart from one another in relation to the one or more external structures.

Clause 10. The aircraft of any of Clauses 1-9, wherein the one or more thermal emitters comprise a grid having a plurality of segments separated by open areas.

Clause 11. The aircraft of any of Clauses 1-10, wherein the one or more thermal emitters further provide electromagnetic effect protection to the one or more external structures without a separate current carrying path.

Clause 12. The aircraft of any of Clauses 1-11, wherein a control unit is configured to determine a configuration for the one or more thermal emitters based on a unit area that is representative of a portion of the one or more external structures.

Clause 13. The aircraft of Clause 12, wherein the control unit is configured to generate a one dimensional thermal resistance model to determine a temperature of an exposed outer mold line patch of the aircraft.

Clause 14. The aircraft of any of Clauses 1-13, wherein the one or more thermal emitters comprise a plurality of cells connected together in a tessellated pattern.

Clause 15. A method comprising:
integrating one or more thermal emitters with one or more of external structures of an aircraft;
providing electrical power to the one or more thermal emitters by one or more of an auxiliary power unit of the aircraft, a power distribution system of the aircraft, one or more engines of the aircraft, or an external power cart that is separate and distinct from the aircraft; and
generating heat, by the one or more thermal emitters, to deice the one or more external structures.

Clause 16. The method of Clause 15, wherein said integrating comprises integrating the one or more thermal emitters with all of the external structures.

Clause 17. The method of Clauses 15 or 16, wherein said integrating comprises mounting the one or more thermal emitters to one or more exterior surfaces of the one or more external structures.

Clause 18. The method of any of Clauses 15-17, wherein said integrating comprises covering less than an entirety of the one or more external structures with the one or more thermal emitters.

Clause 19. The method of any of Clauses 15-18, further comprising providing, by the one or more thermal emitters, electromagnetic effect protection to the one or more external structures without a separate current carrying path.

Clause 20. The method of an of Clauses 15-19, further comprising determining, by a control unit, a configuration for the one or more thermal emitters based on a unit area that is representative of a portion of the one or more external structures.

Clause 21. The method of Clause 20, further comprising generating, by the control unit, a one dimensional thermal resistance model to determine a temperature of an exposed outer mold line patch of the aircraft.

Clause 22. The method of any of Clauses 15-20, wherein said integrating comprises tessellating a plurality of cells of the one or more thermal emitters connected together.

Clause 23. An aircraft comprising:
external structures including one or more of a fuselage, one or more wings, an empennage, a vertical stabilizer, a horizontal stabilizer, or control surfaces; and
one or more thermal emitters integrated with all of the external structures, wherein the one or more thermal emitters cover less than an entirety of the external structures, wherein the one or more thermal emitters comprise a grid having a plurality of segments separated by open areas, wherein the one or more thermal emitters are configured to generate heat to deice the one or more external structures, and wherein the one or more thermal emitters are configured to receive electrical power from one or more of an auxiliary power unit of the aircraft, a power distribution system of the aircraft, one or more engines of the aircraft, or an external power cart that is separate and distinct from the aircraft,
wherein the one or more thermal emitters further provide electromagnetic effect protection to the external structures without a separate current carrying path,
wherein a control unit is configured to determine a configuration for the one or more thermal emitters based on a unit area that is representative of a portion of the one or more external structures, and
wherein the control unit is configured to generate a one dimensional thermal resistance model to determine a temperature of an exposed outer mold line patch of the aircraft.

As described herein, examples of the present disclosure provide improved systems and methods for deicing surfaces of an aircraft. Further, examples of the present disclosure provide effective and efficient systems and methods for deicing surfaces of an aircraft. Also, examples of the present disclosure provide cost-effective and environmentally friendly systems and methods for deicing surfaces of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:
external structures; and
thermal emitters integrated with the external structures, wherein the thermal emitters are configured to generate heat to deice the external structures, and wherein the thermal emitters are configured to receive electrical power from one or more sources,
a control unit, wherein the control unit determines a configuration for the thermal emitters by creating a unit area that is representative of a portion of the external structures, wherein the unit area has a width and an exposed length in relation to an outer mold line of the external structures, and wherein the control unit generates a one dimensional thermal resistance model to determine a temperature of an exposed outer mold line patch of the external structures, and
wherein the unit area includes the thermal emitters including a plurality of segments over the portion of the external structures and the control unit determines a spacing between the plurality of segments so that the thermal emitters provide sufficient deicing heat to the portion of the external structures.

2. The aircraft of claim 1, wherein the one or more sources comprise an auxiliary power unit of the aircraft, a power distribution system of the aircraft, one or more engines of the aircraft, and an external power cart that is separate and distinct from the aircraft.

3. The aircraft of claim 1, wherein the external structures comprise one or more of a fuselage, one or more wings, an empennage, a vertical stabilizer, a horizontal stabilizer, or control surfaces.

4. The aircraft of claim 1, wherein the thermal emitters are integrated with all of the external structures.

5. The aircraft of claim 1, wherein the thermal emitters are mounted to exterior surfaces of the external structures.

6. The aircraft of claim 1, wherein the thermal emitters are embedded within the external structures.

7. The aircraft of claim 1, wherein the thermal emitters are formed of a metal matrix composite.

8. The aircraft of claim 1, wherein the thermal emitters comprise one or more of wires, ribbons, tape, or strips.

9. The aircraft of claim 1, wherein the thermal emitters cover less than an entirety of the external structures.

10. The aircraft of claim 1, wherein the thermal emitters comprise the plurality of segments spaced apart from one another in relation to the external structures.

11. The aircraft of claim 1, wherein the thermal emitters comprise a grid having the plurality of segments separated by open areas.

12. The aircraft of claim 1, wherein the thermal emitters further provide electromagnetic effect protection to the external structures without a separate current carrying path.

13. The aircraft of claim 1, wherein the thermal emitters comprise a plurality of cells connected together in a tessellated pattern.

14. The aircraft of claim 1, wherein the control unit is further configured to determine an amount of heat to apply for deicing in relation to the unit area, which the control unit uses to determine the configuration in relation to an entirety of the external structures.

15. The aircraft of claim 1, wherein the control unit is configured to determine the configuration based on a maximum service temperature, dimensions of the external structures, a minimum deicing time, a maximum deicing time, and required electrical power.

16. The aircraft of claim 1, wherein the control unit is configured to determine the configuration by referencing a predetermined heat necessary to create a layer of water under a stack of snow and ice.

17. A method comprising:
integrating thermal emitters with external structures of an aircraft;
determining, by a control unit, a configuration for the thermal emitters by creating a unit area that is representative of a portion of the external structures, wherein the unit area has a width and an exposed length in relation to an outer mold line of the external structures, and wherein the unit area includes the thermal emitters including a plurality of segments over the portion of the external structures;
determining, by the control unit, a spacing between the plurality of segments so that the thermal emitters provide sufficient deicing heat to the portion of the external structures;
generating, by the control unit, a one dimensional thermal resistance model to determine a temperature of an exposed outer mold line patch of the external structures; and
generating heat, by the thermal emitters, to deice the external structures.

18. The method of claim 17, wherein said integrating comprises integrating the thermal emitters with all of the external structures.

19. The method of claim 17, wherein said integrating comprises mounting the thermal emitters to one or more exterior surfaces of the external structures.

20. The method of claim 17, wherein said integrating comprises covering less than an entirety of the external structures with the thermal emitters.

21. The method of claim 17, further comprising providing, by the thermal emitters, electromagnetic effect protection to the external structures without a separate current carrying path.

22. The method of claim 17, wherein said integrating comprises tessellating a plurality of cells of the thermal emitters connected together.

23. The method of claim 17, further comprising:
determining, by the control unit, an amount of heat to apply for deicing in relation to the unit area, which the control unit uses to determine the configuration for the thermal emitters in relation to an entirety of the external surfaces,
wherein said determining, by the control unit, the configuration for the thermal emitters is based on a maximum service temperature, dimensions of the external structures, a minimum deicing time, a maximum deicing time, and required electrical power, and wherein said determining, by the control unit, the configuration further comprises referencing a predetermined heat necessary to create a layer of water under a stack of snow and ice.

24. An aircraft comprising:
external structures including one or more of a fuselage, one or more wings, an empennage, a vertical stabilizer, a horizontal stabilizer, or control surfaces; and
thermal emitters integrated with all of the external structures, wherein the thermal emitters cover less than an entirety of the external structures, wherein the thermal emitters comprise a grid having a plurality of segments separated by open areas, wherein the thermal emitters are configured to generate heat to deice the external structures, and wherein the thermal emitters are configured to receive electrical power from one or more of an auxiliary power unit of the aircraft, a power distribution system of the aircraft, one or more engines of the aircraft, or an external power cart that is separate and distinct from the aircraft,
wherein the thermal emitters further provide electromagnetic effect protection to the external structures without a separate current carrying path,
a control unit, wherein the control unit determines a configuration for the thermal emitters by creating a unit area that is representative of a portion of the external structures, wherein the unit area has a width and an exposed length in relation to an outer mold line of the external structures, and wherein the control unit generates a one dimensional thermal resistance model to determine a temperature of an exposed outer old line patch of the external structures, and
wherein the unit area includes the thermal emitters including the plurality of segments over a portion of the external structures and the control unit determines a spacing between the plurality of segments so that the thermal emitters provide sufficient deicing heat to the portions of the external structures.

* * * * *